(12) United States Patent
Boggess

(10) Patent No.: US 7,690,722 B2
(45) Date of Patent: Apr. 6, 2010

(54) ENERGY ABSORBING VEHICLE HOOD STOPPER ASSEMBLY

(75) Inventor: Brian Boggess, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 275 days.

(21) Appl. No.: 11/751,358

(22) Filed: May 21, 2007

(65) Prior Publication Data

US 2008/0290692 A1 Nov. 27, 2008

(51) Int. Cl.
B60R 21/34 (2006.01)
B62D 25/12 (2006.01)

(52) U.S. Cl. .................................. 296/207; 296/187.04

(58) Field of Classification Search ............ 296/187.04, 296/193.09, 193.11, 207; 180/69.2
See application file for complete search history.

(56) References Cited

U.S. PATENT DOCUMENTS

| | | | | |
|---|---|---|---|---|
| 4,653,968 | A * | 3/1987 | Rapata et al. ................ | 411/247 |
| 5,988,305 | A * | 11/1999 | Sakai et al. ............ | 296/187.04 |
| 6,039,388 | A * | 3/2000 | Choi ........................... | 296/207 |
| 6,119,306 | A * | 9/2000 | Antonucci et al. .......... | 16/86 A |
| 6,318,795 | B1 * | 11/2001 | Pyo ............................. | 296/207 |
| 6,612,644 | B2 * | 9/2003 | Ahn ....................... | 296/187.04 |
| 6,676,197 | B2 * | 1/2004 | Ozawa ................... | 296/187.03 |
| 6,698,820 | B2 * | 3/2004 | Nakata ................... | 296/193.09 |
| 6,817,435 | B2 | 11/2004 | Takeuchi | |
| 6,840,659 | B2 | 1/2005 | Brown et al. | |
| 7,159,685 | B2 * | 1/2007 | Knight-Newbury et al. . | 180/274 |
| 7,377,579 | B2 * | 5/2008 | Kwon ..................... | 296/193.09 |
| 7,392,876 | B2 * | 7/2008 | Browne et al. .............. | 180/274 |
| 7,413,239 | B2 * | 8/2008 | Mitsuyama ............ | 296/187.04 |
| 7,497,508 | B2 * | 3/2009 | Wallman et al. ........ | 296/193.11 |
| 7,575,273 | B2 * | 8/2009 | Wallman et al. ........ | 296/193.11 |
| 2006/0237998 | A1 * | 10/2006 | Andre et al. ........... | 296/193.11 |
| 2009/0091158 | A1 * | 4/2009 | Wallman et al. ........ | 296/187.04 |

(Continued)

FOREIGN PATENT DOCUMENTS

DE 19948881 A1 * 4/2001

(Continued)

Primary Examiner—Glenn Dayoan
Assistant Examiner—Paul A Chenevert
(74) Attorney, Agent, or Firm—Mark K. Duell; Rankin, Hill & Clark LLP

(57) ABSTRACT

An energy absorbing stopper assembly for an associated vehicle for absorbing at least a portion of the energy during an associated impact is provided. The associated vehicle includes a pivotally disposed closure and a body member toward which the closure is closable. The closure includes an open position and a closed position. The stopper assembly includes a stopper for supporting a non-hinged end of the closure when the closure is in the closed position. The stopper includes a first end and a second end. The first end of the stopper is in contact with one of the closure or the body member when the closure is in the closed position and is spaced apart therefrom when the closure is in the open position. A base for supporting the second end of the stopper is provided. The base is attached to the other of the closure or the body member. An energy absorbing joint is disposed adjacent the base and the other of the closure or the body member. The energy absorbing joint is substantially resilient below a maximum load value. Wherein the energy absorbing joint deforms and the base, the stopper, and the closure deflect, while absorbing at least a portion of the energy during an associated impact.

21 Claims, 14 Drawing Sheets

U.S. PATENT DOCUMENTS

2009/0102239 A1 * 4/2009 Iwai et al. .............. 296/193.11

FOREIGN PATENT DOCUMENTS

| | | | |
|---|---|---|---|
| DE | 100 62 155 A1 | | 6/2002 |
| DE | 10244345 A1 | * | 4/2004 |
| DE | 10247425 A1 | * | 4/2004 |
| DE | 10308371 A1 | * | 9/2004 |
| DE | 102005007089 A1 | * | 8/2006 |
| EP | 1104726 A2 | * | 6/2001 |
| EP | 1 488 987 A1 | | 12/2004 |
| EP | 1 619 088 A1 | | 1/2006 |
| EP | 1 642 786 A2 | | 4/2006 |
| EP | 1712433 A2 | * | 10/2006 |
| EP | 1712434 A1 | * | 10/2006 |
| EP | 1719691 A1 | * | 11/2006 |
| EP | 1842745 A1 | * | 10/2007 |
| JP | 09123945 A | * | 5/1997 |
| JP | 2000280816 A | * | 10/2000 |
| JP | 2001233250 A | * | 8/2001 |
| JP | 2001287669 A | * | 10/2001 |
| JP | 2002037129 A | * | 2/2002 |
| JP | 2002096710 A | * | 4/2002 |
| JP | 2004058948 A | * | 2/2004 |
| JP | 2005001493 A | | 1/2005 |
| JP | 2005082046 A | * | 3/2005 |
| JP | 2005112138 A | * | 4/2005 |
| JP | 2005171849 A | * | 6/2005 |
| JP | 2005280415 A | * | 10/2005 |
| JP | 2006096254 A | * | 4/2006 |
| JP | 2006096255 A | * | 4/2006 |
| JP | 2006096280 A | * | 4/2006 |
| JP | 2006096281 A | * | 4/2006 |
| JP | 2006096282 A | * | 4/2006 |
| JP | 2006117006 A | * | 5/2006 |
| JP | 2006159987 A | * | 6/2006 |
| JP | 2006306237 A | * | 11/2006 |
| JP | 2007038733 A | * | 2/2007 |
| JP | 2007091079 A | * | 4/2007 |
| JP | 2007098985 A | * | 4/2007 |
| JP | 2008001154 A | * | 1/2008 |
| JP | 2008230504 A | * | 10/2008 |
| WO | WO 03/011659 A1 | | 2/2003 |
| WO | WO 3011658 A1 | * | 2/2003 |
| WO | WO 2004014714 A1 | * | 2/2004 |
| WO | WO 2004083009 A1 | * | 9/2004 |
| WO | WO 2004083020 A2 | * | 9/2004 |
| WO | WO 2005/002933 | | 1/2005 |
| WO | WO 2005120908 A1 | * | 12/2005 |
| WO | WO 2006051072 A1 | * | 5/2006 |
| WO | WO 2006091996 A1 | | 9/2006 |
| WO | WO 2007090997 A2 | * | 8/2007 |

\* cited by examiner

ENERGY ABSORBING VEHICLE HOOD STOPPER ASSEMBLY

BACKGROUND

The present disclosure generally relates to the area of stopper devices for supporting a vehicle hood when the hood is in a closed position. More particularly, the present disclosure relates to hood stoppers that include energy absorbing characteristics in the event of a pedestrian-hood impact.

Conventional hood stopper assemblies typically involve one or more stopper members disposed between the hood and a peripheral edge of the engine compartment. Each stopper member is generally attached to a horizontal cross member adjacent the front of the associated vehicle such that an underside of the hood is supported by the one or more stopper members when in a closed position. In addition, the stopper members are usually fabricated from a semi-pliable compound (e.g. rubber) to provide at least some degree of cushioning and vibration damping when the hood is closed or being closed. However, over time it has been recognized that in vehicular collisions where a pedestrian is involved, it is desirable to provide additional damping or shock absorption in or around the hood. This is the case since in the majority of pedestrian related collisions, the pedestrian typically impacts the hood region of the vehicle with his or her head and or other body parts. This type of impact is commonly referred to as a pedestrian hood strike.

To reduce or eliminate the possibility of severe injury resulting from a pedestrian hood strike, hood stopper systems have been designed to lessen the initial shock or impact of the pedestrian with a hood of the associated vehicle. These systems vary from deformable hood stopper brackets to hood systems that fracture or break apart at strategic locations. However, these systems are often bulky, difficult to implement into existing hood stopper designs, and are more costly to manufacture. Accordingly, it is desirable to develop a hood stopper assembly that overcomes the foregoing and other problems and disadvantages.

SUMMARY

According to one aspect, an energy absorbing stopper assembly for an associated vehicle for absorbing at least a portion of the energy during an associated impact is provided. The associated vehicle includes a pivotally disposed closure and a body member toward which the closure is closable. The closure includes an open position and a closed position. The stopper assembly includes a stopper for supporting a non-hinged end of the closure when the closure is in the closed position. The stopper includes a first end and a second end. The first end of the stopper is in contact with one of the closure or the body member when the closure is in the closed position and is spaced apart therefrom when the closure is in the open position. A base for supporting the second end of the stopper is provided. The base is attached to the other of the closure or the body member. An energy absorbing joint is disposed adjacent the base and the other of the closure or the body member. The energy absorbing joint is substantially resilient below a maximum load value. Wherein the energy absorbing joint deforms and the base, the stopper, and the closure deflect, while absorbing at least a portion of the energy during an associated impact.

According to another aspect, a hood stopper system for an associated vehicle for absorbing at least a portion of impact energy during a pedestrian hood strike is provided. The associated vehicle includes a hood for covering an engine compartment of the associated vehicle. The hood includes a hinged end and a free end and the hood includes an open position and a closed position. The engine compartment includes a horizontal support disposed adjacent the free end of the hood when the hood is in the closed position. The system includes a hood stopper for supporting the free end of the hood when the hood is in the closed position. The hood stopper includes a first end and a second end. The first end of the stopper is in contact with one of an underside of the hood or the horizontal support when the hood is in the closed position and is spaced apart therefrom when the hood is in the open position. A base including a fixed end and a free end is provided. The fixed end of the based is secured to the other of the horizontal support or the underside of the hood via a deformable joint. The second end of the hood stopper is secured to the base for supporting the hood stopper and the free end of the hood. A break-away energy absorbing adhesive bond is disposed adjacent the base. The adhesive bond includes a maximum stress value and is substantially resilient when subject to a hood load below the maximum stress value. Wherein, the maximum stress value is exceeded and the adhesive bond ruptures to allow the base, the hood stopper, and the hood to deflect and absorb at least a portion of the impact energy during the pedestrian hood strike.

According to yet another aspect, a hood stopper system for an associated vehicle for absorbing at least a portion of an impact energy during a pedestrian hood strike. The associated vehicle includes a hood for covering an engine compartment of the associated vehicle. The hood includes a hinged end and a free end and the hood includes an open position and a closed position. The engine compartment includes a support member disposed adjacent the free end of the hood when the hood is in the closed position. The system includes a hood stopper for supporting the free end of the hood when the hood is in the closed position. The hood stopper includes a first end and a second end. The first end of the stopper is in contact with one of an underside of the hood of the associated vehicle or the support member when the hood is in the closed position and is spaced apart therefrom when the hood is in the open position. A plate is disposed adjacent the other of the underside of the hood or the support member and the hood stopper is secured to the plate. The plate is adapted to support the hood stopper and the free end of the hood. An energy absorbing region is provided in the plate adjacent the hood stopper. The energy absorbing region includes a maximum stress value and is substantially resilient when subject to a hood load below the maximum stress value. Wherein the maximum stress value is exceeded and the energy absorbing region fractures to allow the hood and the hood stopper to deflect and absorb at least an initial portion of the impact energy during the pedestrian hood strike.

According to yet another aspect, a method for absorbing at least a portion of an impact energy between a pedestrian and a hood of an associated vehicle is provided. The method includes the steps of providing an energy absorbing hood stopper assembly. The assembly being disposed beneath the hood of the associated vehicle and secured to one of a cross support member or an underside portion of the hood. The hood stopper assembly including a hood stopper and a base plate. The base plate being secured to the other of the support member or the underside portion of the hood. The method also includes the step of providing an energy absorbing joint adjacent the base plate. The energy absorbing joint having a maximum stress value below which the joint remains resilient. The step of exceeding the maximum stress value of the joint during a pedestrian hood impact is provided. The step of deforming or shearing the energy absorbing joint, the hood, and the base plate is provided. And, the step of absorbing at least a portion of the impact energy during the pedestrian hood impact is provided.

DETAILED DESCRIPTION

Figure 1:
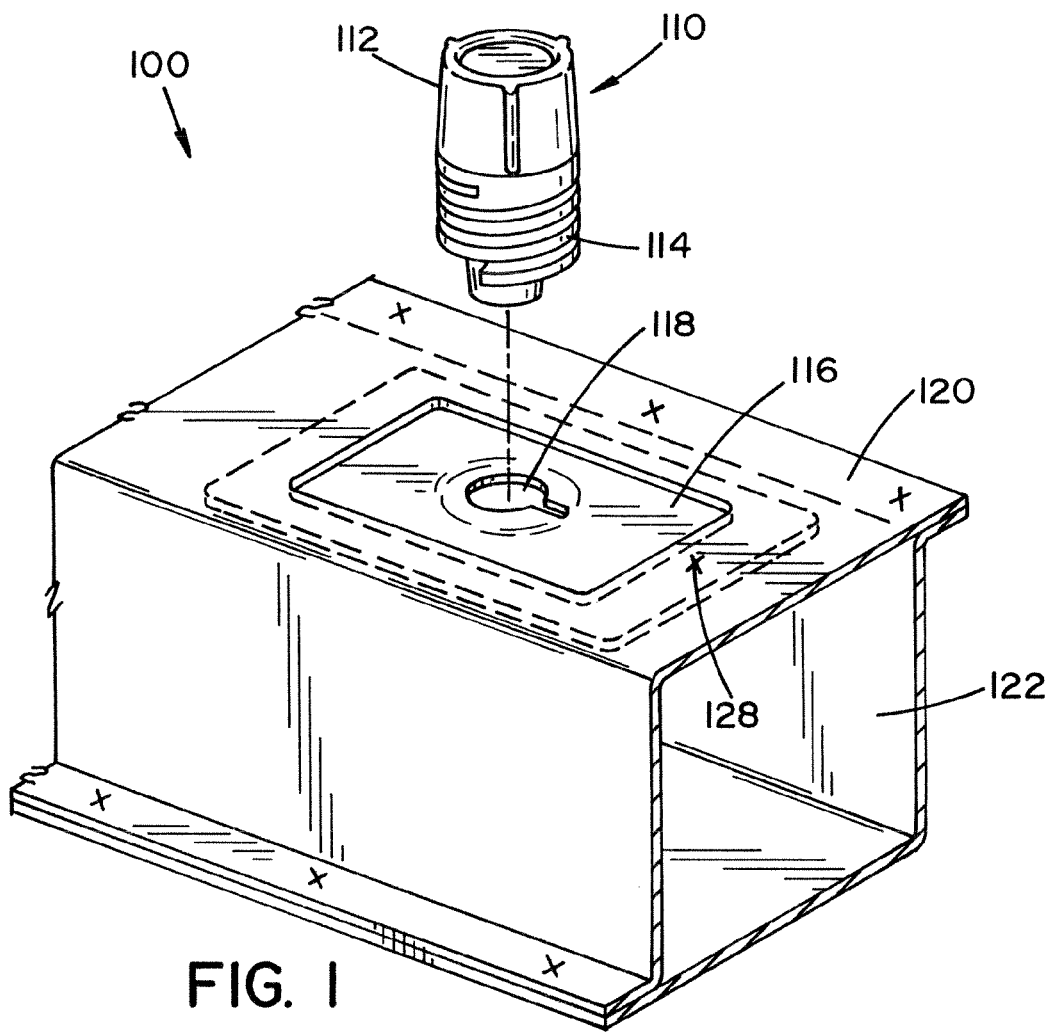
FIG. 1 is a perspective view of a first embodiment of an energy absorbing hood stopper assembly for a vehicle.
Figure 2:
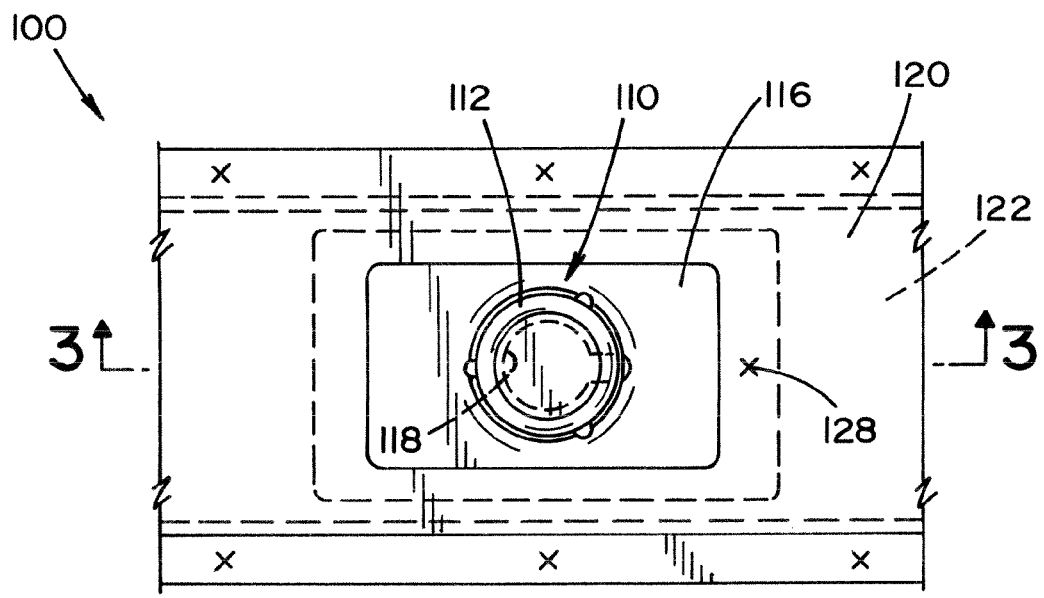
FIG. 2 is top view of the hood stopper assembly of FIG. 1.

Referring now to the drawings wherein the showings are for purposes of illustrating one or more exemplary embodiments, FIGS. 1-4 illustrate a first embodiment of a hood stopper assembly 100 for an associated vehicle. With specific reference to FIGS. 1 and 2, the hood stopper assembly 100 generally includes a hood stopper 110 having a first end 112 and a second end 114. The first end 112 may be cylindrical in shape as shown in FIGS. 1 and 2 or of any other geometric configuration suitable for contacting an underside portion of a hood for an associated vehicle. The second end 114 of the hood stopper 110 may include an external threaded portion for engaging a base plate 116. In addition, the external threaded portion can be integrally formed of one piece with the stopper 110. The base plate 116 may include a threaded aperture 118 for receiving the threaded portion 114 of the hood stopper 110. Furthermore, the base plate 116 can be mounted to a vehicle body member or horizontal support 120 that is suitable for withstanding the normal hood loads of the vehicle. The horizontal support 120 could be any structural or body member located in or around the engine compartment of the vehicle.

Generally, the horizontal support spans across a forward portion of the engine compartment so as to support, for example, a hood latch mechanism, an upper portion of a radiator, a headlamp, and or an A/C condenser heat exchanger. In addition, the horizontal support may take the form of a channel such that a hollow or empty cavity 122 is provided just below a top wall of the horizontal support 120. As illustrated, the base plate 116 is mounted along the top wall. The cavity 122 thus allows for a vertical downward displacement of the hood stopper 110 and the base plate 116 during a pedestrian hood strike or other impact scenario.

Figure 3:
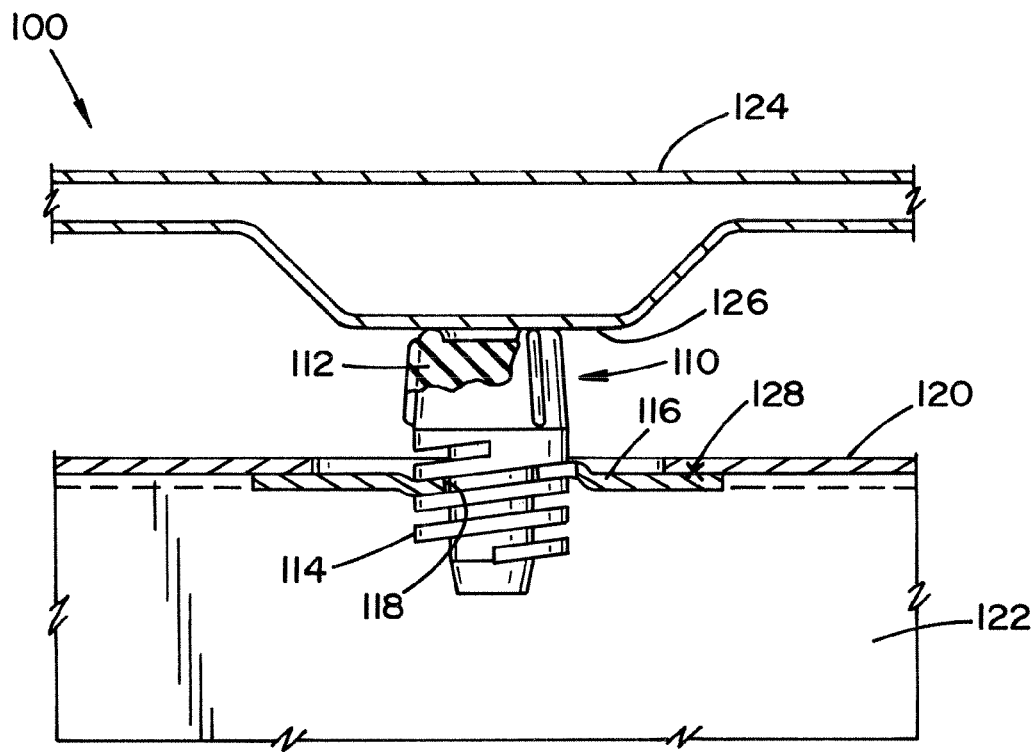
FIG. 3 is a side view of the hood stopper assembly of FIG. 1, partially in cross section, illustrating a hood stopper in contact with a hood of the vehicle, the hood being in a closed position.
Figure 4:
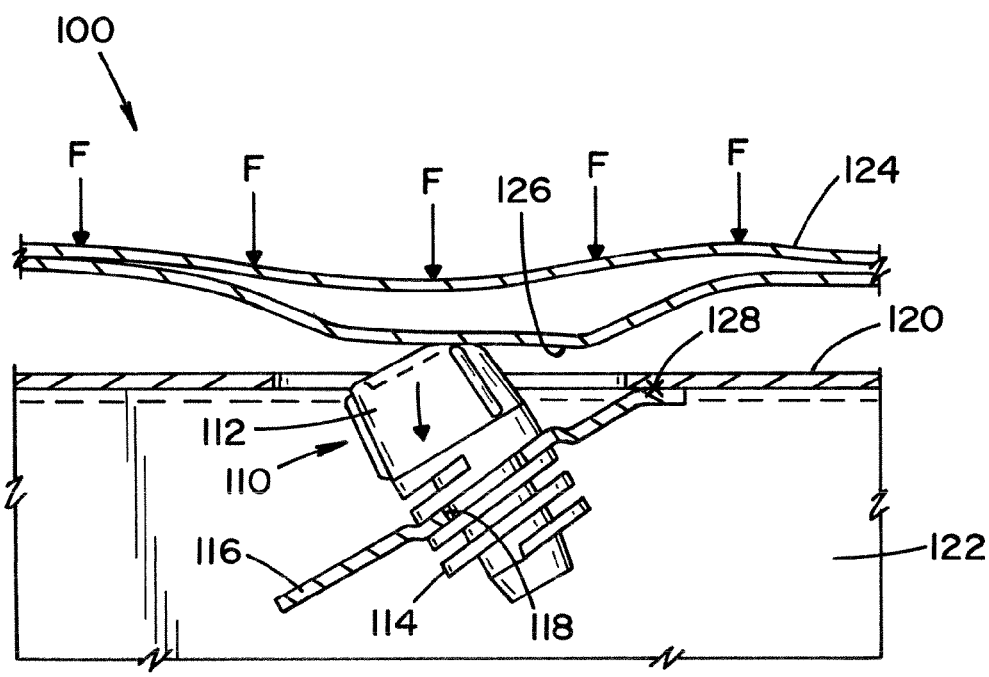
FIG. 4 is a side view of the hood stopper assembly of FIG. 3, illustrating a deformed hood, hood stopper, and base plate after an impact to the hood of the vehicle.

Now with reference to FIGS. 3 and 4, the hood stopper assembly 100 is shown in a pre-impact and a post-impact state, respectively. As shown in FIG. 3, a hood 124 of the vehicle is shown in a closed position and in contact with the first end 112 of the hood stopper 110 along an underside portion 126 of the hood 124. In addition, the threaded end portion 114 is shown threadably engaged with the base plate 116. Under typical loading conditions, the base plate 116 is resiliently held in a horizontal orientation with only a small or insignificant amount of deflection with respect to the horizontal support member 120. Threadably engaging the stopper 110 to the base plate 116 provides a convenient method of adjusting a vertical height of the closed position of the hood by threading the stopper 110 into or out of the base plate 116. In addition, a closed contact pressure between the underside 126 of the hood 124 and the hood stopper 110 can be regulated. Naturally, if the closed contact pressure is too great, premature deformation of the hood stopper assembly 100 may occur during the normal closing operation of the hood.

As shown in FIG. 4, during a pedestrian hood strike or other frontal impact a distributed downward force F is generated along the hood 124. This leads to extensive deformation of the hood 124 as well as the underlying structures. As illustrated, the impact force F has also caused the hood stopper 110 and the base plate 116 to deflect in a downward direction. The hood stopper 110 and the base plate 116 pivot in a cantilevered fashion about an energy absorbing joint 128. In the depicted embodiment, the energy absorbing joint 128 secures the base plate 116 to the horizontal support 120.

The joint 128 may be formed by any known means of securely attaching two rigid members together. For example, a spot weld, a rivet, a shear pin bolt or adhesive bond may in combination or individually comprise the joint 128. The joint 128 absorbs at least a portion of the impact force F in a controlled manner over the duration of the impact. Thus, the energy absorbing joint lowers the rate of deceleration or shock level experienced by the person or object having collided with the hood surface 124. In addition, the hood stopper 110 may be made from a pliable rubber material which will also deform or deflect when the typical hood load conditions are exceeded, further reducing the forces and trauma induced by the impact.

One advantage of the illustrated hood stopper assembly 100 is a resultant reduction in stiffness associated with the hood stopper 110. For example, should a head impact a hood, specifically a portion of a hood over the hood stopper, the stiffness of a conventional hood stopper would be extremely high. However, in the illustrated energy absorbing assembly 100, the hood stopper 110 is able to translate downwardly due to the yield or fracture of some other vehicle component (e.g. the energy absorbing joint 128). Accordingly, the stiffness of the hood stopper 110 is reduced (possibly to zero) in the overall stiffness associated with the hood stopper assembly 100. Thus, the force or shock received during a head impact is reduced and the risk of a severe injury is lowered.

Figure 5:
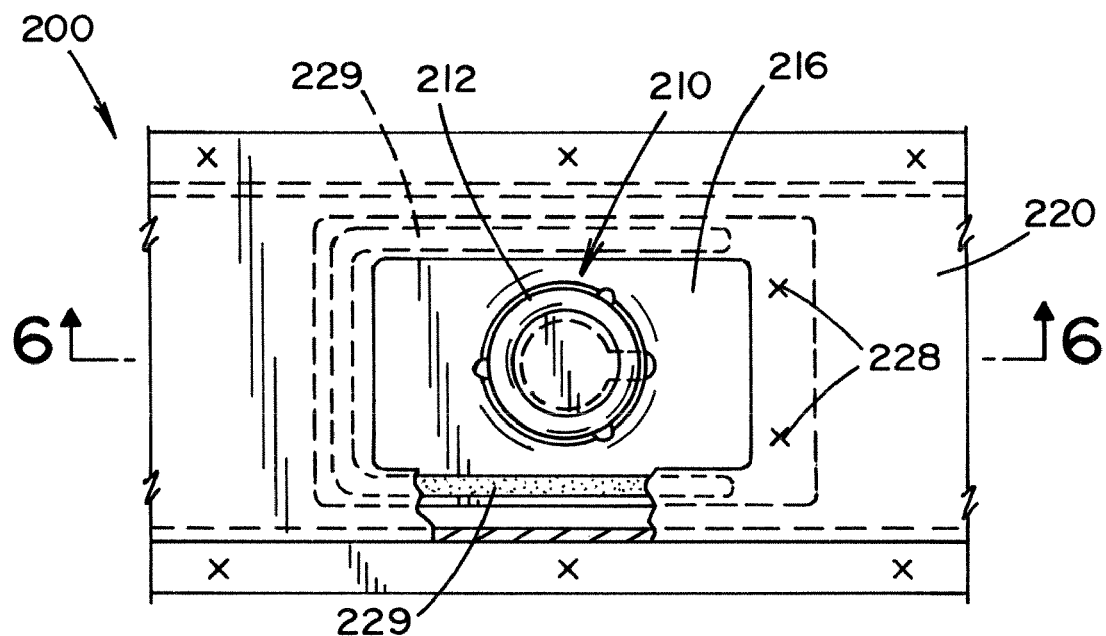
FIG. 5 is a top down view of a second embodiment of an energy absorbing hood stopper assembly for a vehicle, illustrating a break-away adhesive bond.
Figure 6:
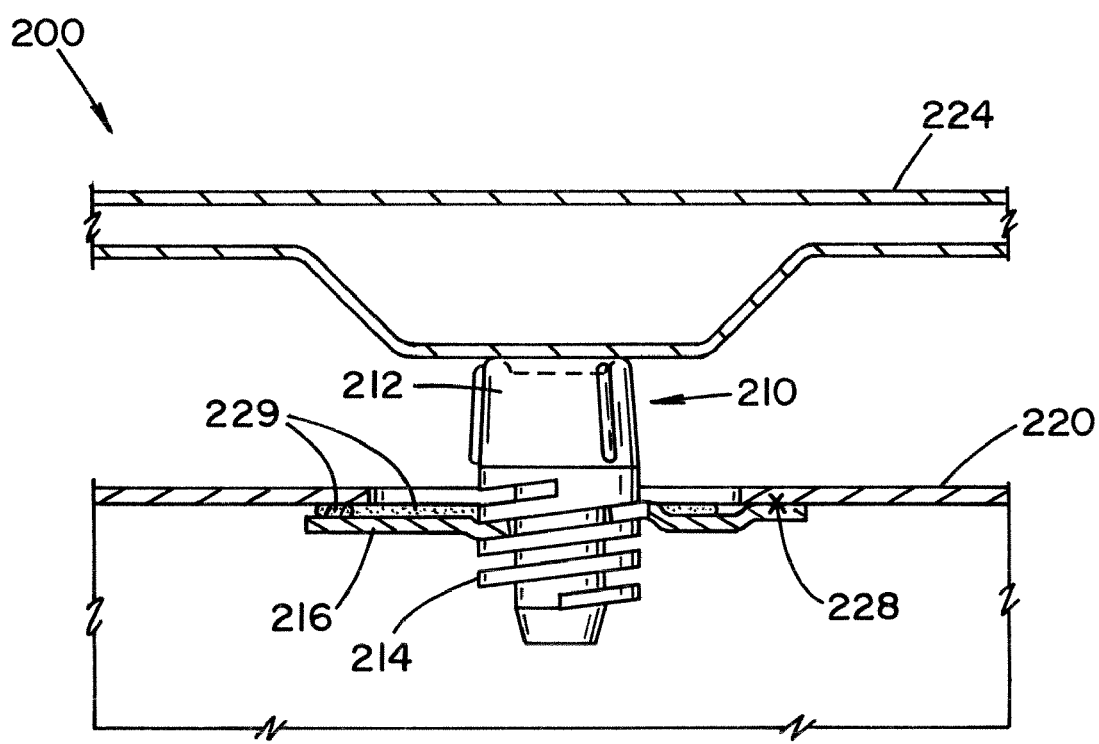
FIG. 6 is a side view of the hood stopper assembly of FIG. 5, partially in cross section, illustrating a hood stopper in contact with a hood of the vehicle while the hood is in a closed position.

Now with reference to FIGS. 5 and 6, a top and side view of a second embodiment of a hood stopper assembly 200 are shown, respectively. The hood stopper 210 of the second embodiment is the same or similar to that of the first embodiment of the hood stopper assembly 100 except as indicated herein. The hood stopper assembly 200 generally includes a hood stopper 210 having a first end 212 and a second or threaded end 214 which is threadably engaged with a base plate 216. As with the first embodiment, the base plate 216 is attached to a horizontal support member 220 of the engine compartment. In this case, one or more energy absorbing joints 228 are provided for rigidly securing at least one end of the base plate 216 to the horizontal support member 220. In addition, a break away adhesive bond 229 may be disposed between the base plate 216 and the horizontal support 220 along a peripheral edge or ends of the base plate 216. The break away adhesive bond 229 cooperates with the one or more energy absorbing joints 228 to resiliently secure the base plate 216 to the horizontal support 220.

Figure 7:
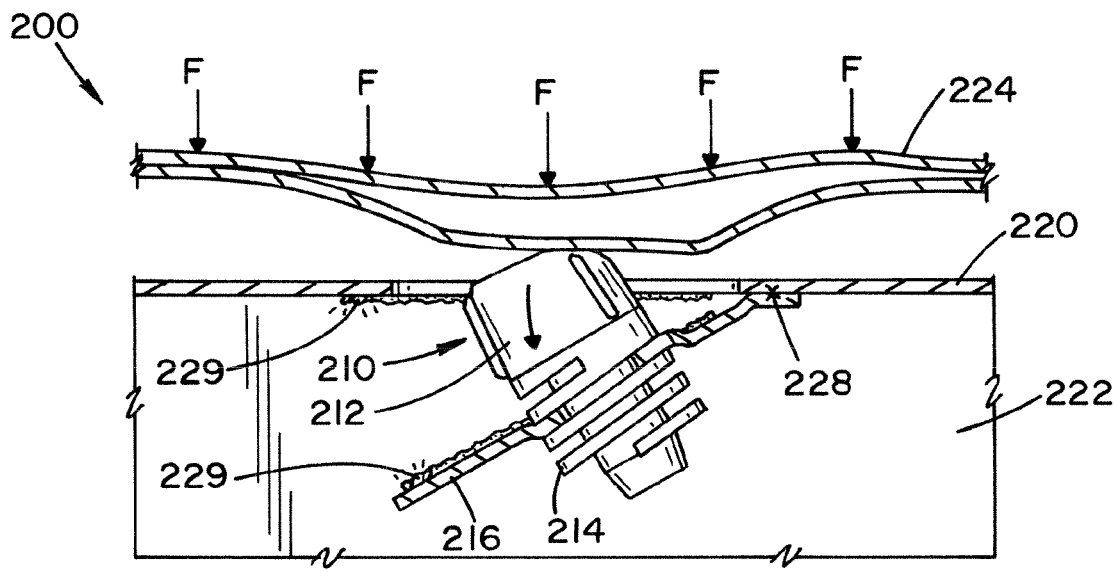
FIG. 7 is a side view of the hood stopper assembly of FIG. 6, illustrating a ruptured break-away adhesive bond as well as a deformed hood, hood stopper, and base plate after an impact to the hood of the vehicle.

Now with reference to FIG. 7, the hood stopper assembly 200 is shown in a post-impact state resulting from a frontal collision of the hood surface 224 of the vehicle. As with the previous embodiment, a large distributed downward load or force F is exerted along the upper surface of the hood 224 during the impact. This generally causes the hood 224 to deform, as well as to cause the hood stopper 210 and base plate 216 to deflect in a downward fashion into the cavity portion 222 below the horizontal support member 220. The primary difference between the second embodiment of the hood stopper assembly 200 and the first embodiment of the hood stopper assembly 100 involves the initial response characteristics of the base plate 216 and the energy absorbing joint 228 after being subjected to the impact force F. Specifically, the break away bond 229 will prevent an initial downward deflection of the base plate 216 and the hood stopper 210 until a maximum stress value (i.e. ultimate tensile strength) of the bond is reached. Once this maximum stress value is met, the bond 229 ruptures or delaminates from the horizontal support 220 and or the base plate 216. After the rupture, the base plate 216 and the energy absorbing joint 228 then begin to deflect or deform in response to the downward impact force F. In essence, the break away bond 229 absorbs an initial portion of the impact energy whereas the energy absorbing joint 228 absorbs a subsequent portion of the downward impact force F. This serial approach to absorbing the impact energy is extended over a greater duration, which further aids in minimizing the impact to the pedestrian.

An additional benefit to utilizing the break away bond 229 is that it prevents the hood stopper 210 and the base plate 216 from deflecting partially under typical hood loading conditions. As for example, when the hood 224 is closed in a rapid or harder than usual manner. In such cases, it would be undesirable to have the hood stopper assembly partially collapse into the cavity 222, for reasons obvious to those skilled in the art.

Figure 8:
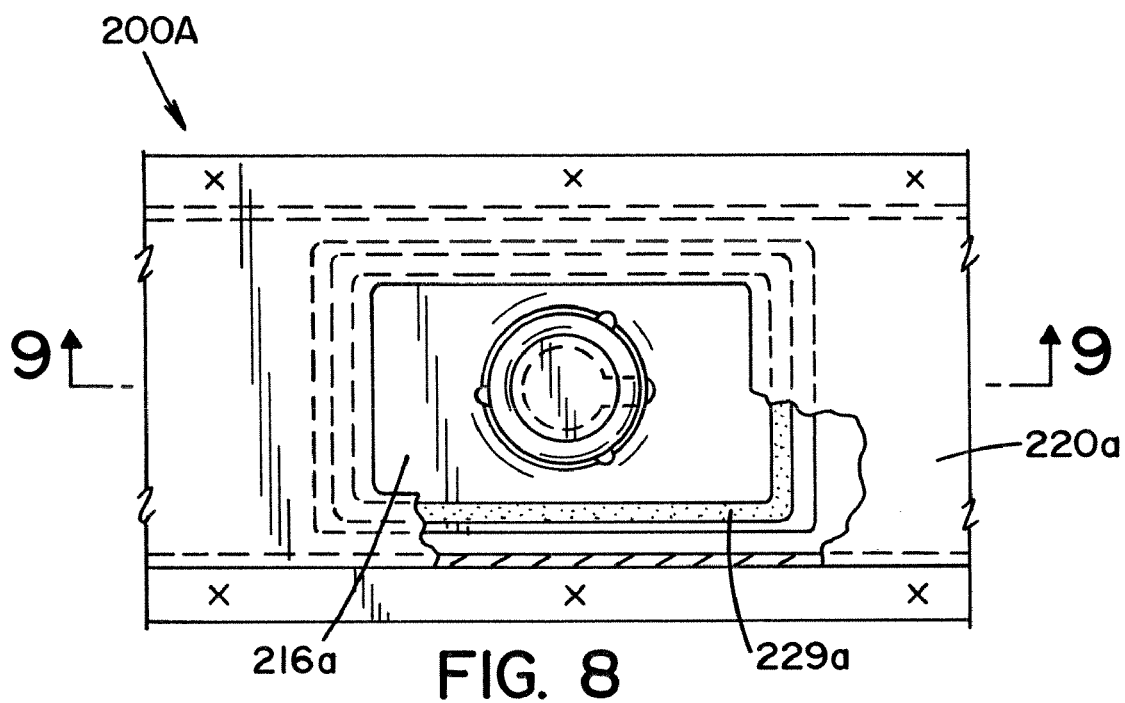
FIG. 8 is a top down view of a variation of the second embodiment with a hood stopper assembly similar to that of FIG. 5, illustrating a break-away adhesive bond disposed entirely about a base plate.
Figure 9:
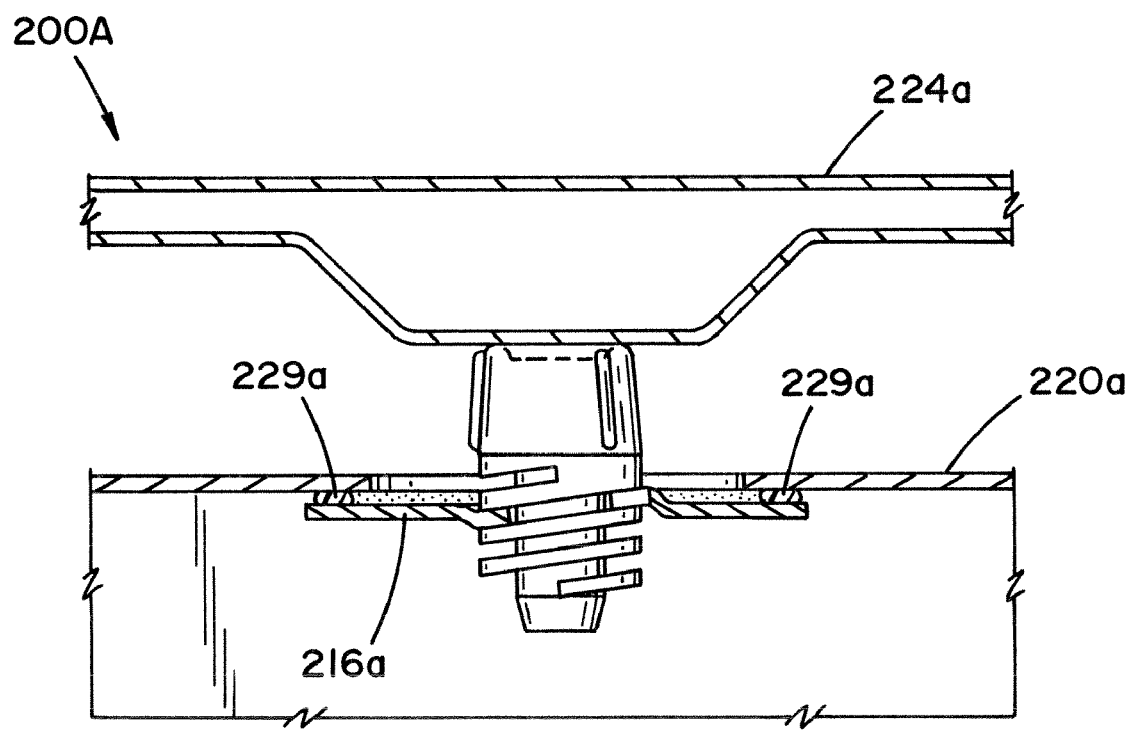
FIG. 9 is a side view of the hood stopper assembly of FIG. 8, shown in partial cross section.

Now with reference to FIGS. 8 and 9, yet another embodiment of a hood stopper assembly 200A is shown. The hood stopper assembly 200A is in many respects similar to the second embodiment of the hood stopper assembly 200 (FIG. 5). However, the hood stopper assembly 200A includes a continuous breakaway adhesive bond 229a disposed between the base plate 216a and the bulkhead or horizontal support member 220a. In addition, the hood stopper assembly 200A does not include a mechanical connection between the base plate 216a and the horizontal support 220a, as for example the energy absorbing joint 228 in the second embodiment of the hood stopper assembly 200 (FIG. 5). Rather, the hood stopper assembly 200A relies entirely on the continuous bond 229a not only for supporting the hood 224a under normal operating conditions but also for serving as an energy absorbing joint during a hood impact.

Figure 10:
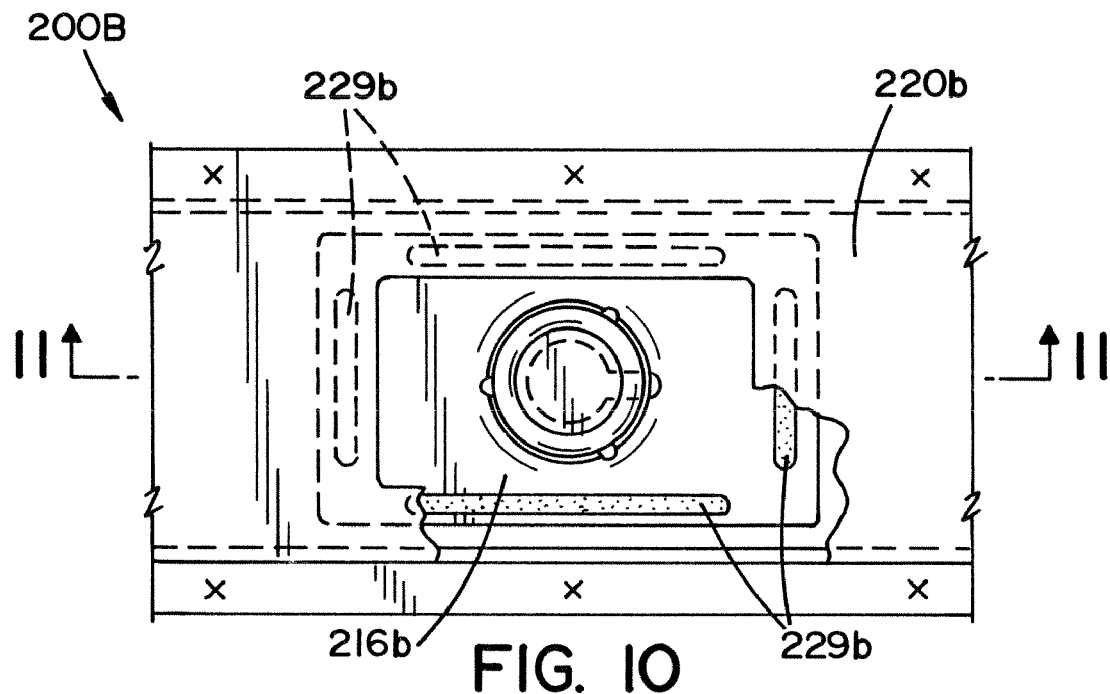
FIG. 10 is a top down view of a variation of the second embodiment with a hood stopper assembly similar to that of FIG. 8, illustrating a break-away adhesive bond disposed in a segmented fashion about a base plate.
Figure 11:
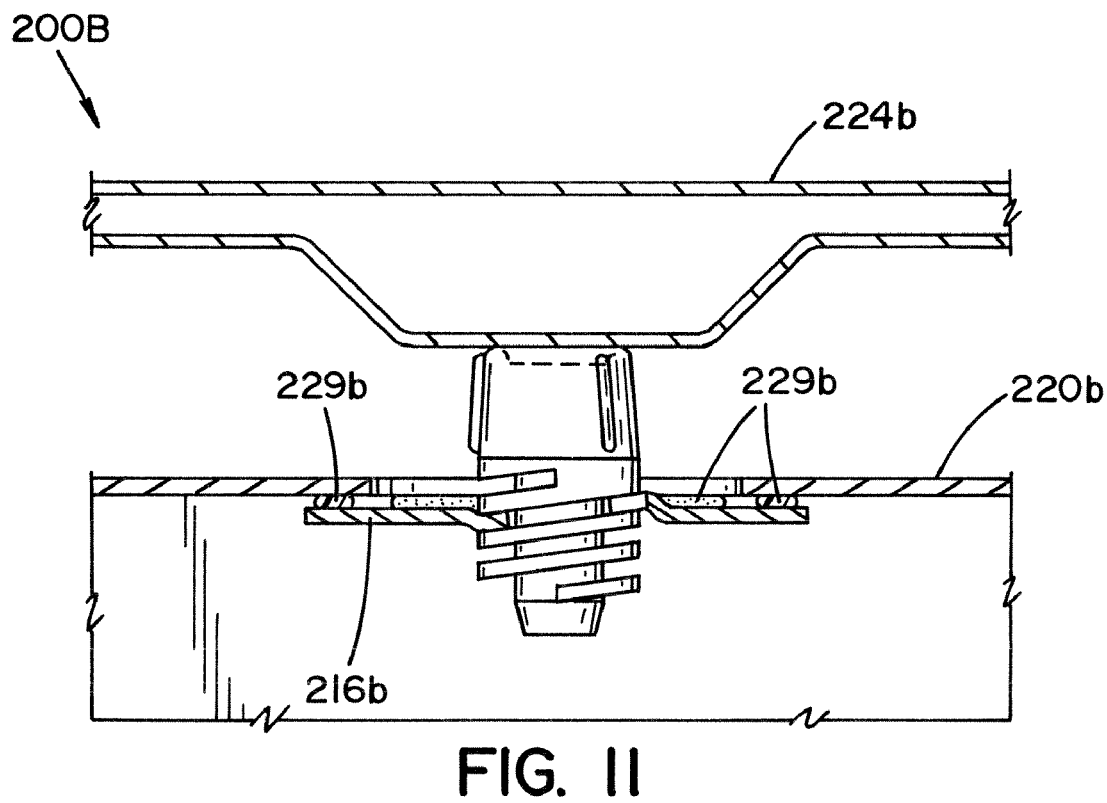
FIG. 11 is a side view of the hood stopper assembly of FIG. 10, shown in partial cross section.

Now with reference to FIGS. 10 and 11, yet another embodiment of a hood stopper assembly 200B is shown. In many respects the hood stopper assembly 200B is similar to the hood stopper assembly 200A previously described. As with the previous embodiments, a break-away adhesive bond 229b is disposed between a base plate 216b and a horizontal support member 220b. However, the hood stopper assembly 200b includes a segmented break-away adhesive bond 229b rather than a continuous bond. In some cases, a segmented break-away bond 229b may be more optimal depending upon the break down characteristics of the adhesive used to create the bond 229b. In other words, if a lower break away force is required, or if an adhesive having a higher yield strength is used, a lesser amount of adhesive need be disposed between the base plate 229b and the horizontal support 220b. Thus, the break-away characteristics during deformation or impact of the hood 224B can remain unchanged while reducing manufacturing costs.

Figure 12:
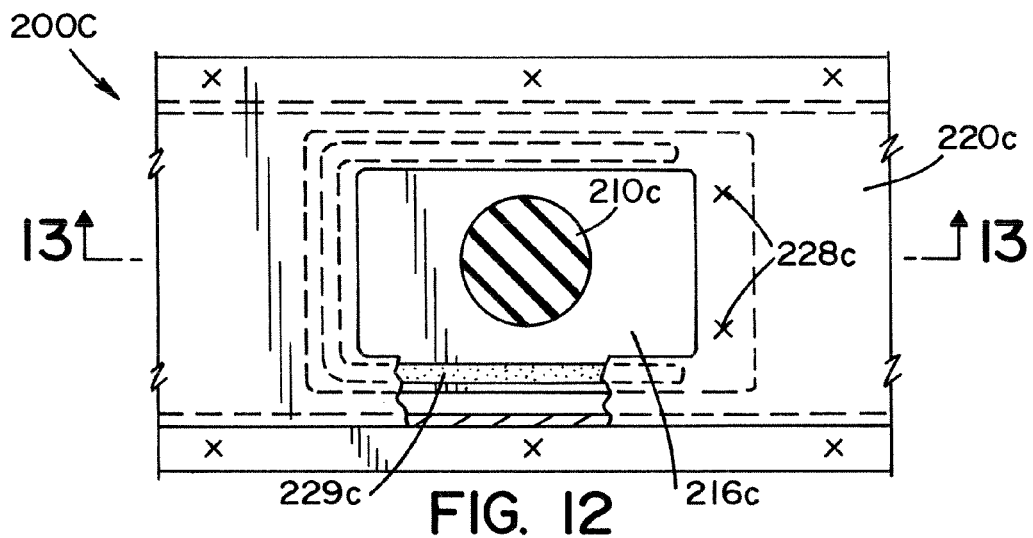
FIG. 12 is a top down view of a variation of the second embodiment with a hood stopper assembly similar to that of FIG. 5, illustrating a hood stopper being attached to an underside portion of a hood of a vehicle rather than a base plate.
Figure 13:
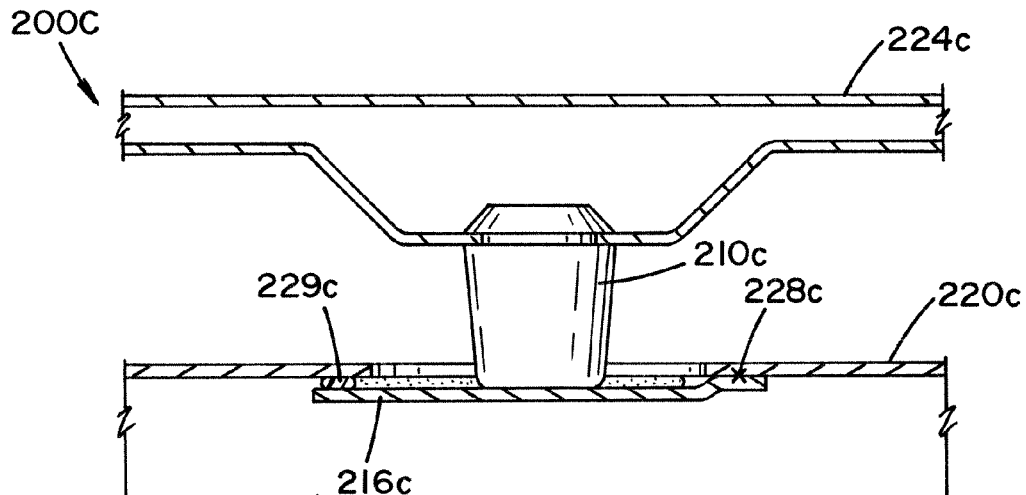
FIG. 13 is a side view of the hood stopper assembly of FIG. 12, shown in partial cross section, with the hood illustrated in the closed position and the hood stopper in contact with the base plate.
Figure 14:
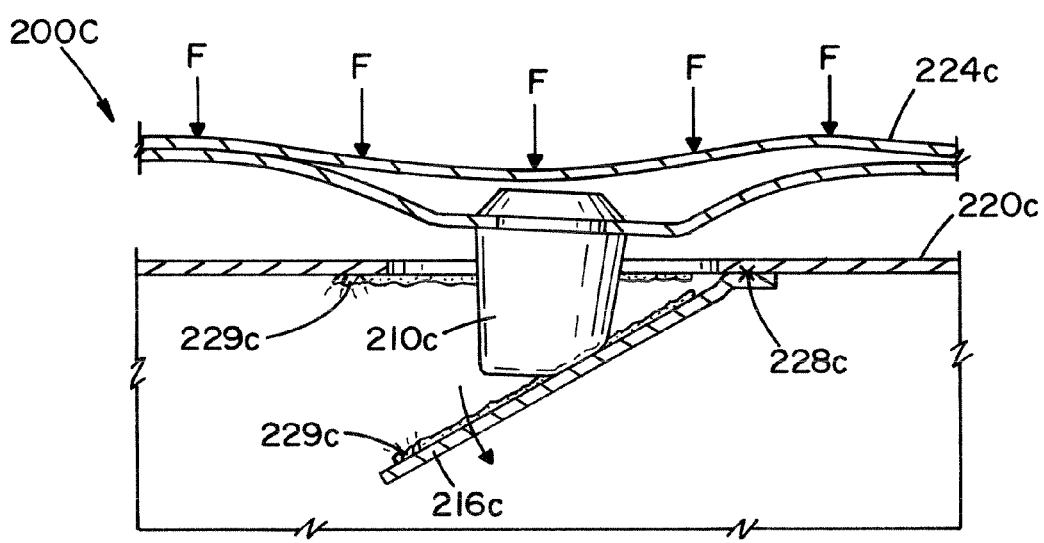
FIG. 14 is a side view of the hood stopper assembly of FIG. 13, illustrating a ruptured break-away adhesive bond as well as a deformed hood, hood stopper, and base plate after an impact to the hood of the vehicle.

Now with reference to FIGS. 12-14, yet another embodiment of a hood stopper assembly 200C is shown. The hood stopper assembly 200C is yet another variation of the second embodiment of the hood stopper assembly 200. As with the previously described second embodiment, a hood stopper 210c is disposed between a support member 220c and a vehicle hood 224c. However, rather than the hood stopper 210c being threadably or otherwise attached to the base plate 216c, the hood stopper 210c is attached to the underside portion of the hood 224c. In addition, an energy absorbing joint 228c may be used in combination with a breakaway adhesive bond 229c for resiliently securing the base plate 216c to the support member 220c while defining a breakaway or rupture characteristic. As before, when the maximum strength of the bond is exceeded due to a force F from a hood impact, the bond 229c ruptures and the base plate 216c bends downward (FIG. 14).

Figure 15:
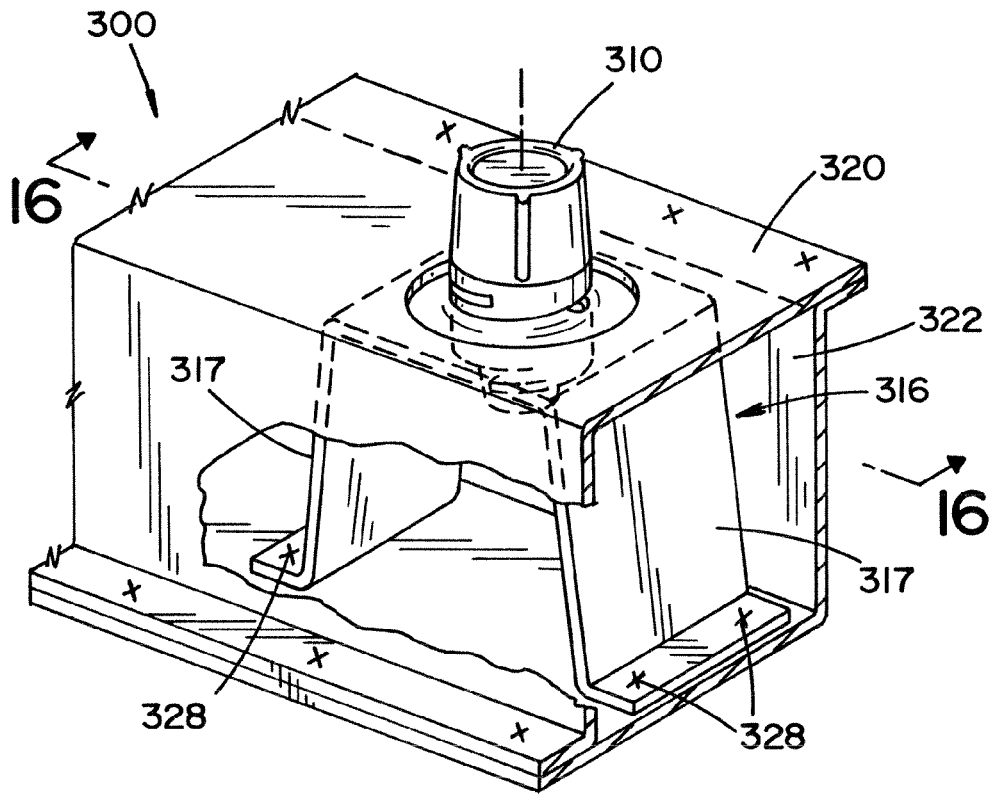
FIG. 15 is a perspective view of a third embodiment of an energy absorbing hood stopper assembly for a vehicle, illustrating an energy absorbing bracket.
Figure 16:
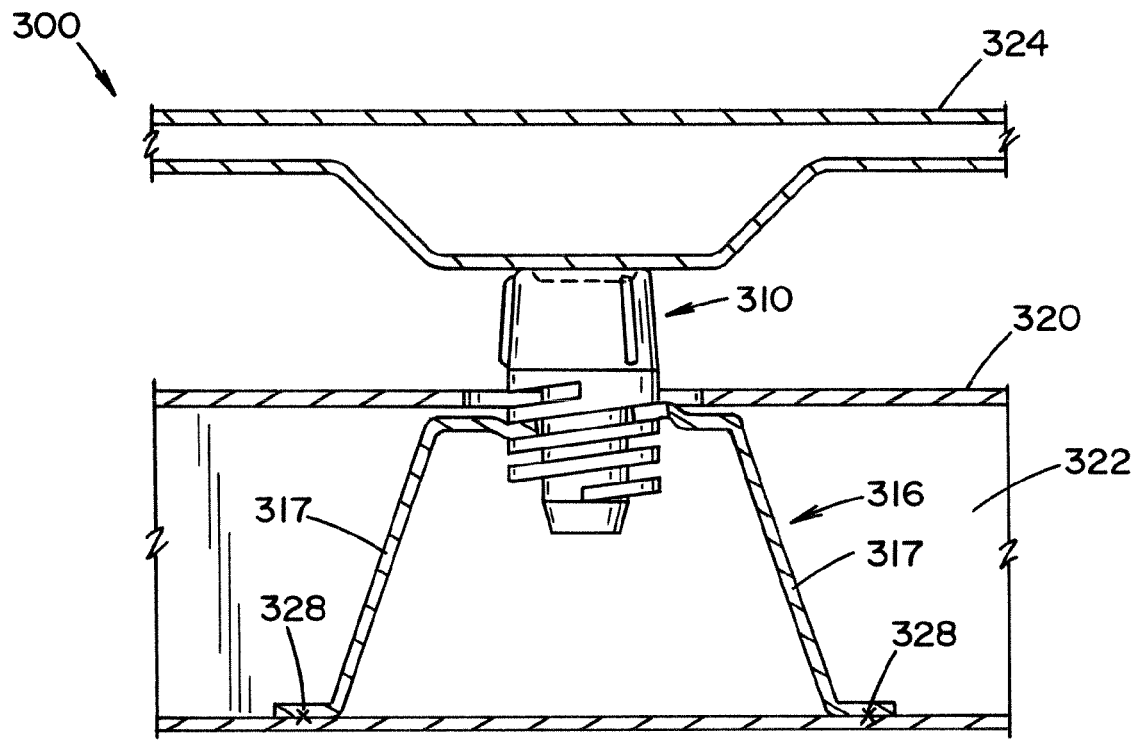
FIG. 16 is a side view of the hood stopper assembly of FIG. 15, partially in cross section, illustrating a hood stopper in contact with a hood of the vehicle while the hood is in a closed position.

Now with reference to FIGS. 15 and 16, a third embodiment of a hood stopper assembly 300 is shown. As with the former embodiments, the hood stopper assembly 300 includes many of the same features except as indicated herein. The hood stopper assembly 300 includes a hood stopper 310 threadably engaged with a support bracket 316 which is rigidly secured to a horizontal support member 320 via a plurality of joints 328. Unlike the energy absorbing joints 128, 228 of the first and second embodiments, the majority of energy absorption in the hood stopper assembly 300 occurs within a pair of legs 317 of the bracket 316.

Figure 17:
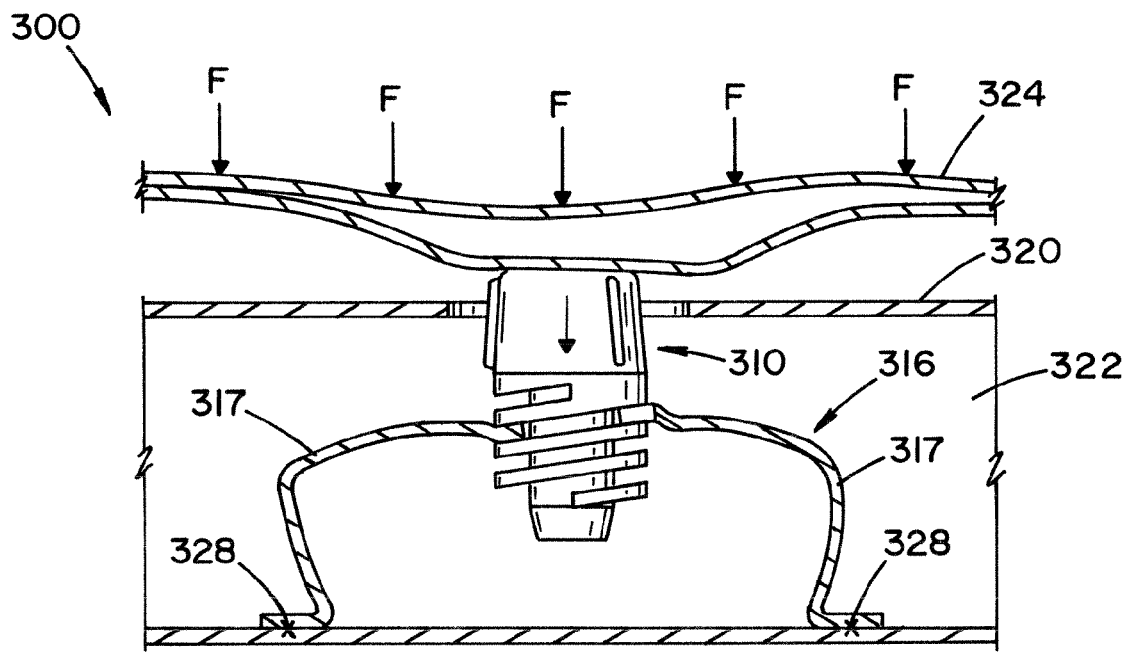
FIG. 17 is a side view of the hood stopper assembly of FIG. 16, illustrating a deformed hood, hood stopper, and bracket after an impact to the hood of the vehicle.

With reference to FIG. 17, the hood stopper assembly 300 is shown in an energy deformed or post-impact state. As before, the impact of the vehicle results in a large downward force F being exerted along the hood 324 which causes the hood stopper 310 to press down on the bracket 316. Eventually, the legs 317 of the bracket 316 deflect outward as at least a portion of the energy of the impact is slowly dissipated and absorbed into the bracket. Once the legs 317 deform or bow outward, the hood stopper 310 is eventually driven completely into the cavity 322 of the horizontal support member 320.

Figure 18:
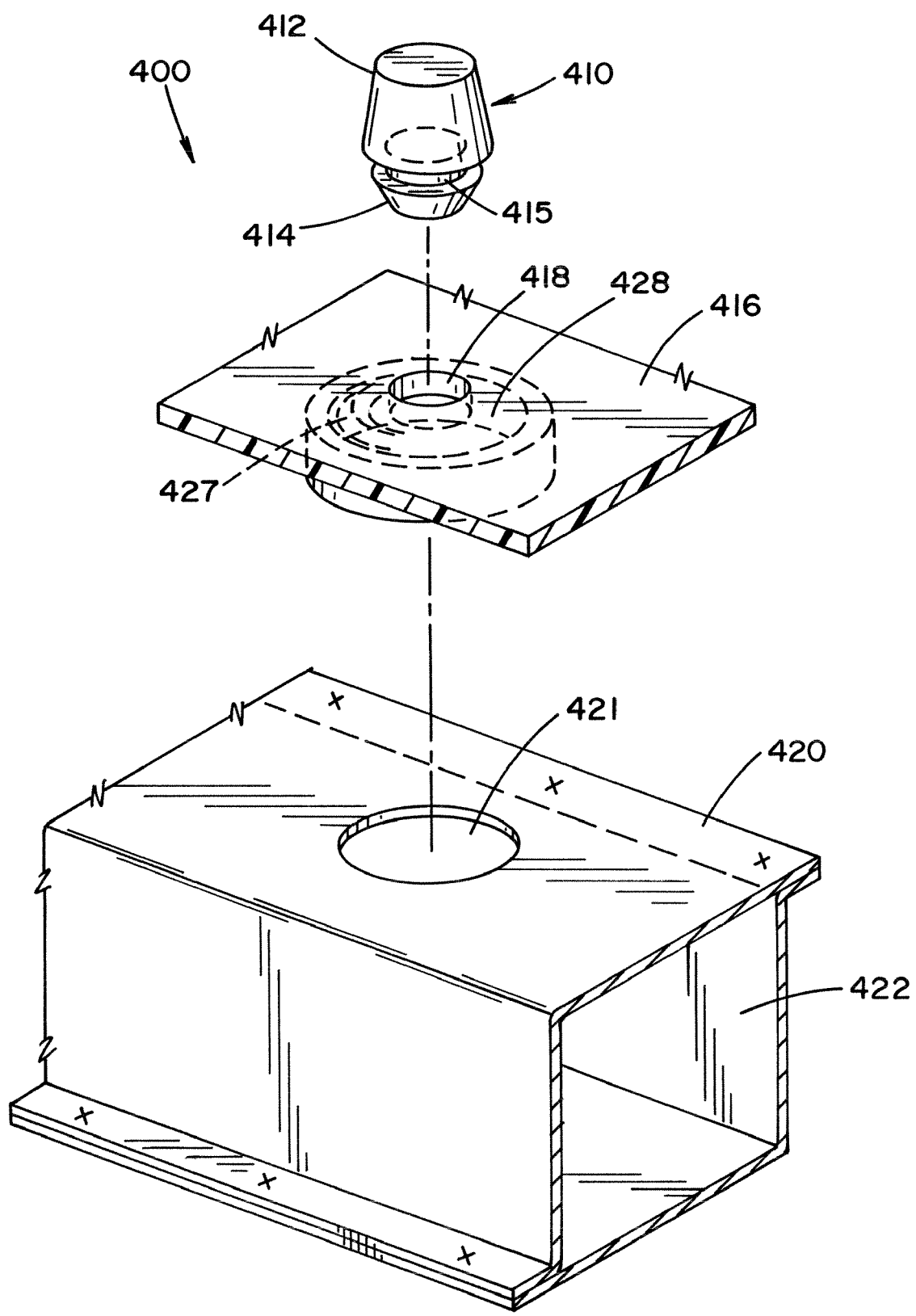
FIG. 18 is a perspective view of a fourth embodiment of an energy absorbing hood stopper assembly for a vehicle.

Now with reference to FIG. 18, a fourth embodiment of a hood stopper assembly 400 is shown. As with the former embodiments, the hood stopper assembly 400 includes a hood stopper 410 having a first end 412 and a second end 414. The second end 414 includes a beveled edge and a reduced diameter portion 415 such that the hood stopper 410 can be snappingly received (i.e., press fit) onto the hood stopper plate 416 via an aperture 418. The plate 416 rests along a top surface of a horizontal support member 420 and can be fabricated from any suitable material. By way of example, the plate 416 can be constructed of a relatively rigid plastic or can be incorporated as part of a bulkhead cover and or garnish. The horizontal support member includes an aperture 421 which is generally aligned with the hood stopper 410. In addition, the aperture 421 is larger in diameter than the hood stopper 410 thus allowing the hood stopper 410 to be driven into a cavity 422 of the horizontal support member 420.

Figure 19:
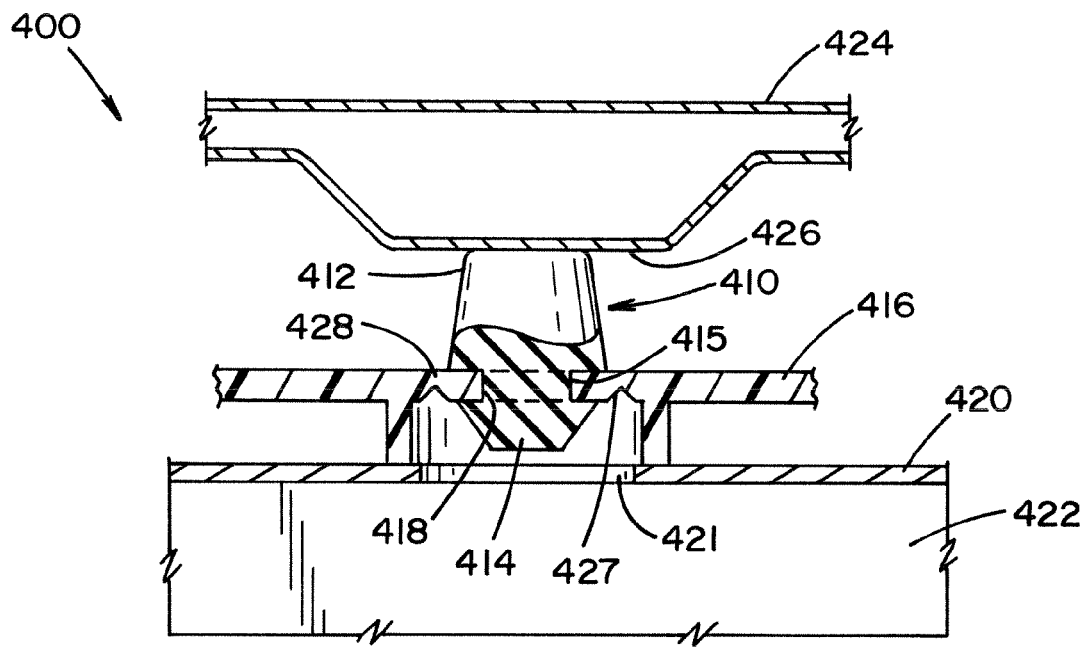
FIG. 19 is a side view of the hood stopper assembly of FIG. 18, partially in cross-section, illustrating a hood stopper in contact with a hood of the vehicle while the hood is in a closed position.

With reference to FIG. 19, the hood stopper assembly 400 is shown with a hood 424 in a closed position. As before, when the hood 424 is in the closed position, the first end 412 of the hood stopper 410 is in contact with an underside 426 of the hood 424. In addition, the hood stopper 410 is shown engaged with the hood stopper plate 416 about the reduced diameter portion 415 of the hood stopper 410. The combination of the reduced diameter portion 415 and the beveled edge of the second end 414, provide an inexpensive and effective method of inserting and securing the hood stopper 410 to the plate 416.

As with the previous embodiments, the hood stopper assembly 400 includes an energy absorbing joint or region 428. The energy absorbing region 428 is disposed about the hood stopper aperture 418 on the plate 416. Specifically, the plate 416 includes a concentric V-shaped groove 427 (i.e., a weakened area) surrounding the hood stopper aperture 418. The groove 427 serves as a stress concentrator in the plate 416 for the forces that are transmitted by the hood into the hood stopper 410 during a collision or impact. Under normal operating circumstances, the plate 416 does not deflect any appreciable amount so long as the maximum allowable shear stress associated with the plate in the general proximity of the groove 427 is not exceeded. It should be noted that while FIG. 19 depicts a V-shaped groove, the groove 427 may be of any geometry. For example, the groove could be semi-circular or square. In addition, this weakened area may not even include a localized groove but rather consist of a relatively large area of reduced thickness in or around the contact area of the hood stopper. Furthermore, the weakened area may be made by molding in a score line or by etching out or otherwise removing material to create a region of concentrated stress.

Figure 20:
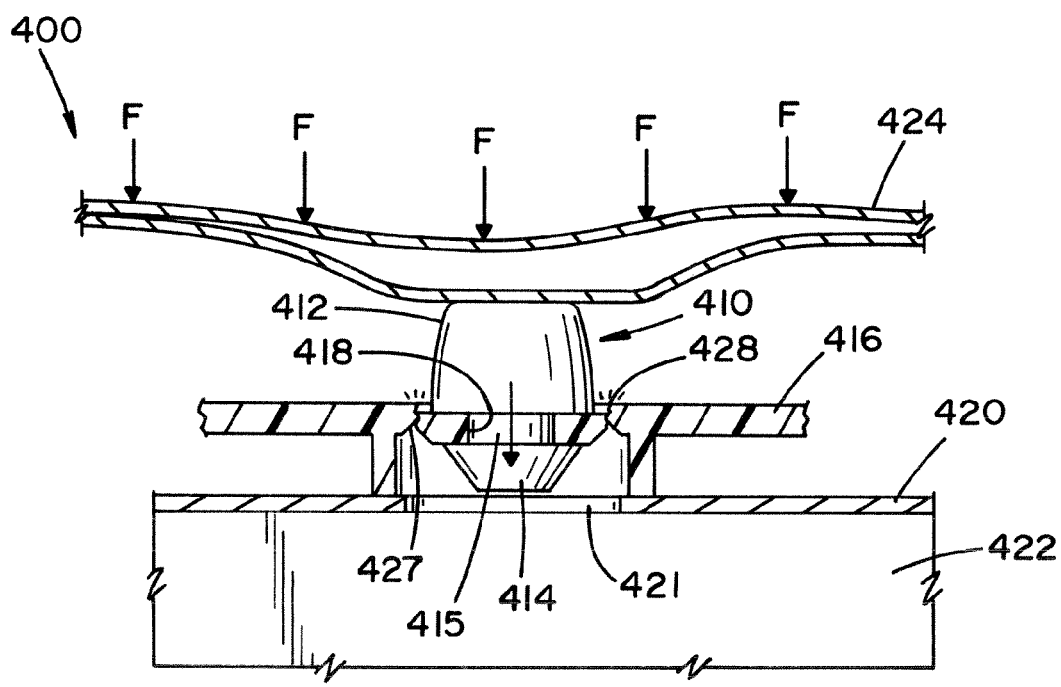
FIG. 20 is a side view of the hood stopper assembly of FIG. 19, illustrating a deformed hood and a cracked or fractured hood stopper plate during an impact to the hood of the vehicle.

Now with reference to FIG. 20, the hood stopper assembly 400 is shown in a partially deformed state. As with the previous embodiments, a large impact force F, such as that during a pedestrian hood strike, would collapse the hood 424 onto the hood stopper 410. The initial shock of the pedestrian hood strike would cause the maximum allowable stress to be exceeded and a stress fracture to be initiated along the V-shaped groove 427. As the impact force F continues to increase, the stress fracture continues to grow or propagate following the concentric V-shaped groove about the hood stopper 410 in the plate 416. The initial formation of the stress fracture absorbs a portion of the impact energy. As the fracture propagates, even more energy is absorbed from the impact force F by the hood stopper 410 and the base plate 416 in the general vicinity of the V-shaped groove 427. Eventually, the energy absorbing region 428 is completely sheared and the hood stopper 410 begins to travel downward through the aperture 421 of the horizontal support member 420 and into the cavity 422.

Figure 21:
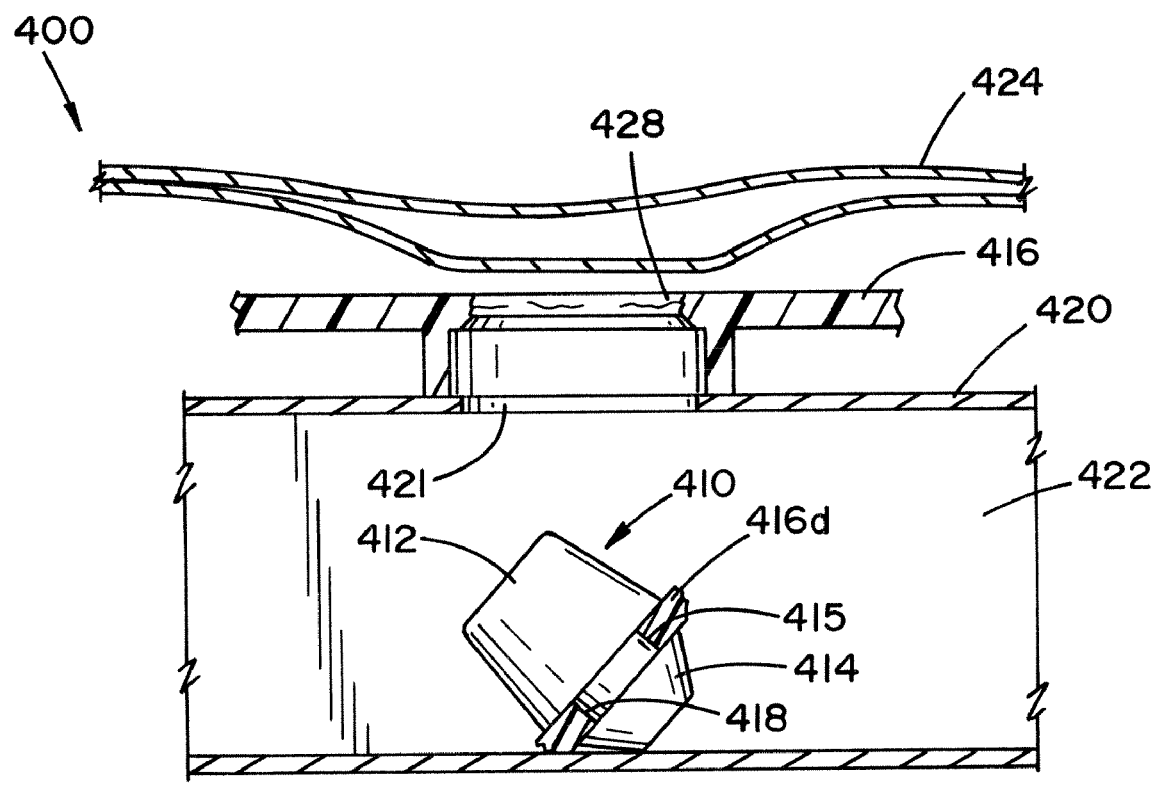
FIG. 21 is a side view of the hood stopper assembly of FIG. 20, illustrating the deformed hood in its final position, as well the hood stopper being entirely detached from the hood stopper plate.

With reference to FIG. 21, a final deformed state of the hood 424, the hood stopper 410, and the hood stopper plate 416 is shown. As described with respect to FIG. 20, when the shear stress of the plate 416 is exceeded about the energy absorbing joint or region 428, the hood stopper 410 and a detached portion 416d of the plate 416 are punched entirely through the plate 416 into the cavity 422. In this manner, energy that would otherwise be transmitted into the pedestrian's body is instead used to fracture or deform the hood stopper plate 416, thus lessening injuries to the pedestrian.

Figure 22:
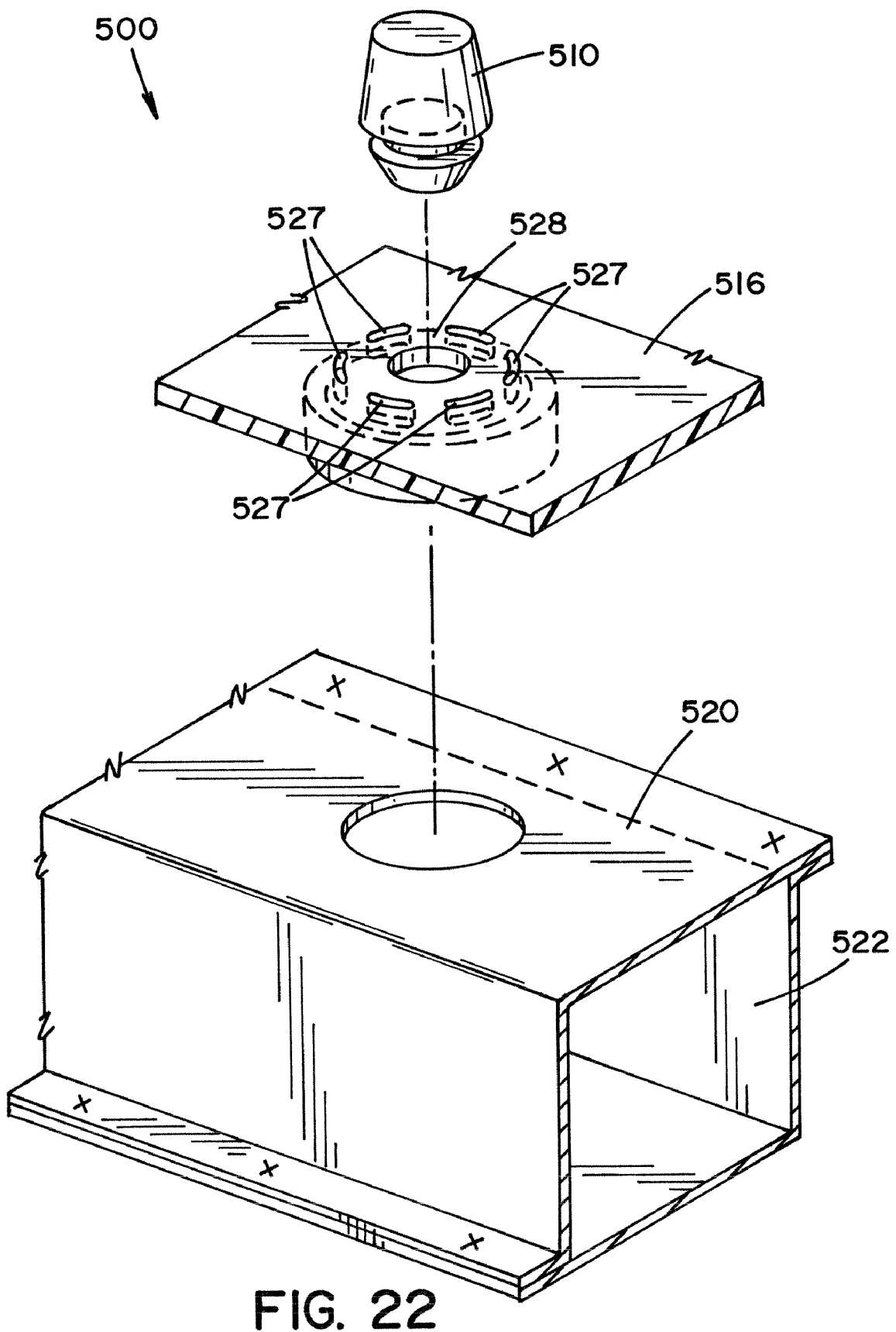
FIG. 22 a perspective view of a variation of the fourth embodiment with an energy absorbing hood stopper assembly including a plurality of elongated perforations disposed about the hood stopper in the hood stopper plate.

With reference to FIG. 22, a variation of the fourth embodiment with a hood stopper assembly 500 is shown. As with the fourth embodiment of the hood stopper assembly, the hood stopper assembly 500 also includes a hood stopper 510 that is received into a plate 516 supported by a support member 520. In addition, the plate 516 includes a series of elongated perforations or apertures 527 which collectively form an energy absorbing region 528. The elongated perforation or apertures 527 are generally disposed about the area in which the hood stopper 510 is attached to or rests upon. Similar to the concentric groove 427 of the fourth embodiment of the hood stopper 400 (FIG. 18), the elongated apertures 527 provide a generally weakened area surrounding the hood stopper 510, such that when an impact force is transmitted into the hood of the vehicle and down into the hood stopper 510, the stress is concentrated between the perforations or apertures 527. When the concentrated stress between the apertures 527 exceeds a maximum allowable shear stress for the energy absorbing region 528, the plate 516 begins to fracture along the elongated apertures 527 absorbing a portion of the impact energy. As the fracture propagates, the hood stopper 510 eventually breaks free of the plate 516 and traverses into a cavity 522 of the support member 520.

Figure 23:
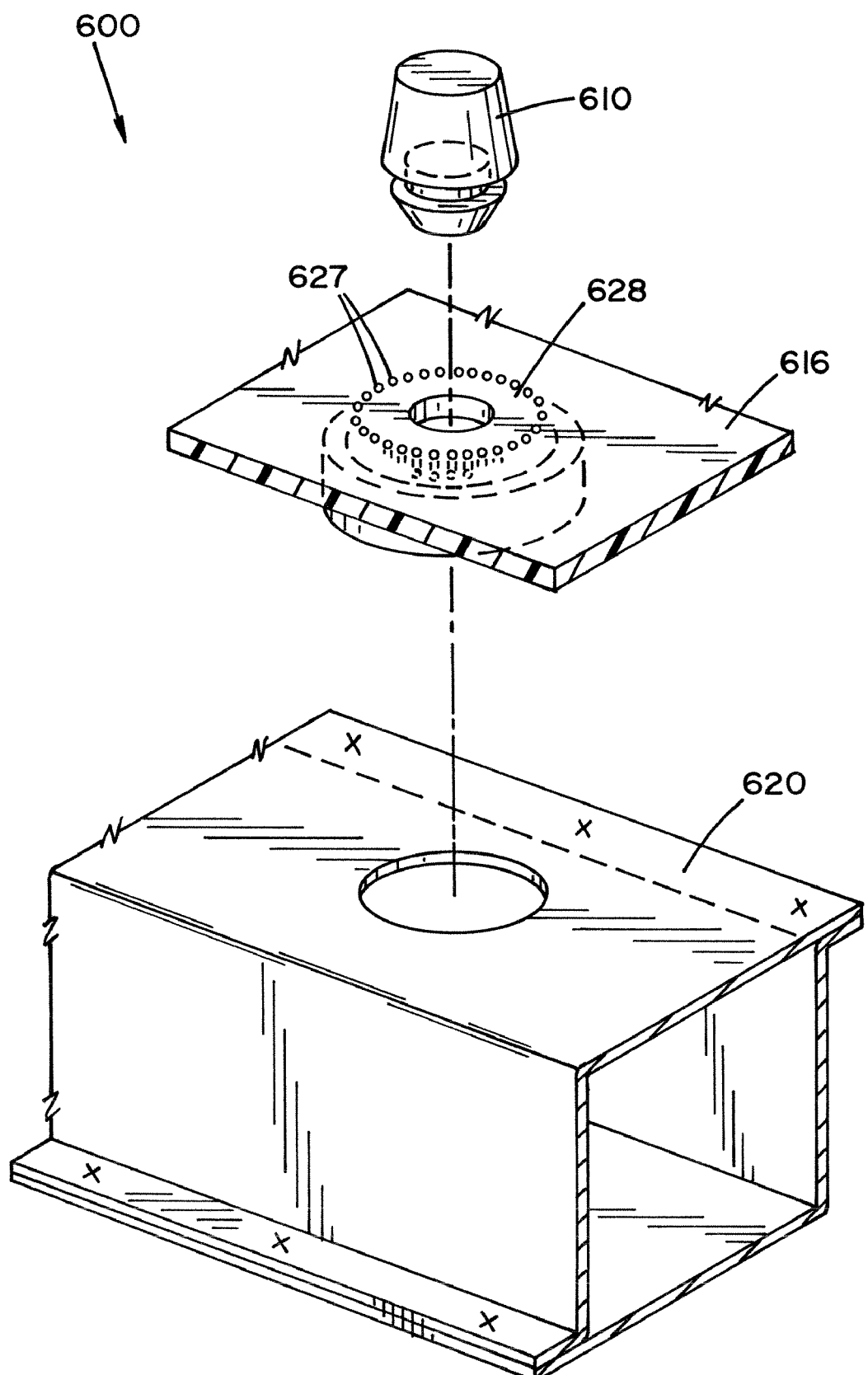
FIG. 23 a perspective view of a variation of the fourth embodiment with an energy absorbing hood stopper assembly including a plurality of micro-perforations disposed about a hood stopper in a hood stopper plate.

With reference to FIG. 23, a variation of the fourth embodiment with a hood stopper assembly 600 is shown. As with the fourth embodiments, the hood stopper assembly 600 includes a hood stopper 610 and a base plate 616 supported by a support member 620. However, instead of a groove or a plurality of elongated apertures disposed about an energy absorbing region 628, a plurality of micro perforations 627 are used. As with the previous embodiments, when a maximum allowable shear stress of the energy absorbing region 628 is exceeded, a fracture initiates between the micro perforations 627 within the energy absorbing region 628. The fracture then propagates from one micro perforation to another while absorbing a portion of the impact energy. This continues until the hood stopper 610 and the energy absorbing region 628 are completely severed from the base plate 616.

Figure 24:
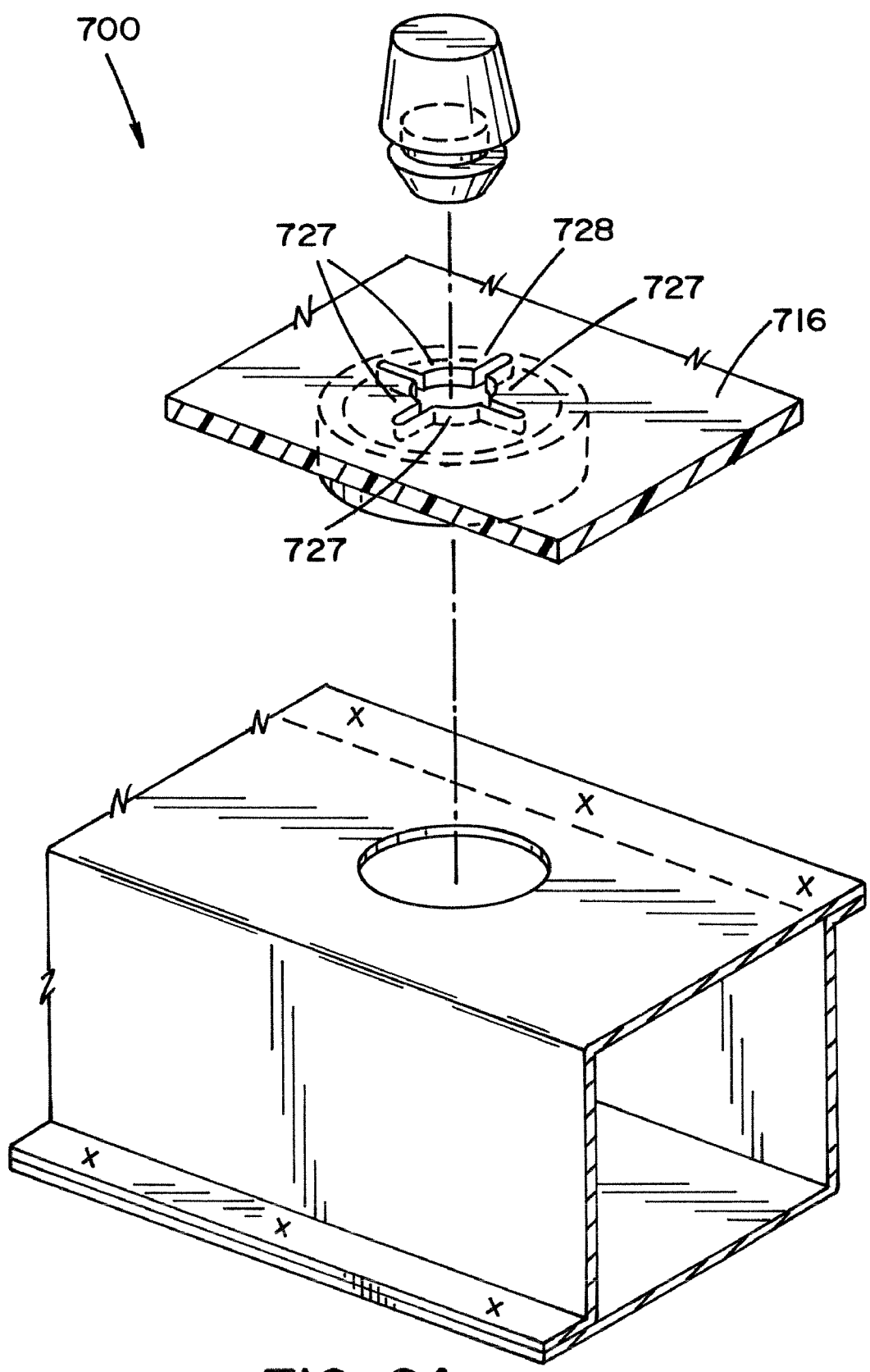
FIG. 24 a perspective view of a variation of the fourth embodiment with an energy absorbing hood stopper assembly including a plurality of break-away tabs disposed about a hood stopper in a hood stopper plate.

Lastly, with reference to FIG. 24, a variation of the fourth embodiment with a hood stopper assembly 700 is shown. The hood stopper assembly 700 includes many of the same features of the fourth embodiments and the previously described variations thereof. However, one distinction involves the use of a plurality of break-away tabs 727 in forming an energy absorbing region 728 in the base plate 716. As before, when the shear and/or tensile stress created within the energy absorbing region 728 is exceeded due to a hood impact, the hood stopper 710 is driven into the plate 716. In the process, the energy absorbing break-away tabs 727 begin to fracture from the base plate 716 and at least a portion of the impact energy is absorbed.

It should be noted that any combination of the energy absorbing regions described with reference to the previous embodiments could be combined to form other variations or fracturing techniques. For example, grooves or scoring, break away tabs, apertures, micro-perforations may be used in any combination desired so as to accomplish the general object of concentrating a stress and or creating a weakened area to absorb an impact energy in a calculated or predetermined manner.

It should also be noted that in all of the above disclosed embodiments, the hood stopper assembly may be reconfigured or reoriented without affecting the overall operation of the assembly. In other words, one or both of the hood stopper and or the deformable plate may be disposed or secured to the underside portion of the hood instead of on the body member or horizontal support. For example, rather than the hood stopper deflecting into the body member it would generally deflect into a cavity provided between the underside of the hood and the top of the hood.

It should further be noted that the inventive concepts of the present disclosure can be applied to other hinged closures or structures on a vehicle. For example, the vehicle doors, trunk, hood, glovebox, and the like, all generally include one or more stopper members. As such, the instant concepts relating to energy absorption during an impact or collision of the vehicle can be applied to these closures as well.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An energy absorbing stopper assembly for an associated vehicle for absorbing at least a portion of the energy during an associated impact, the associated vehicle including a pivotally disposed closure and a body member toward which the closure is closable, the closure having an open position and a closed position, the stopper assembly comprising:

a stopper for supporting a non-hinged end of the closure when the closure is in the closed position, the stopper includes a first end and a second end, the first end of the stopper being in contact with one of the closure or the body member when the closure is in the closed position and being spaced apart therefrom when the closure is in the open position;

a base for supporting the second end of the stopper, the base including a fixed end and a free unsupported opposite end, the fixed end being attached to the other of the closure or the body member and defining a unitary attachment area; and an energy absorbing joint defined at the attachment area, the energy absorbing joint having an undeformed state and a deformed state, the joint being substantially resilient below a maximum load value in the undeformed state and being configured to deform while absorbing at least a portion of the energy during an associated impact of the closure;

wherein the base and the stopper rotatably deflect about the energy absorbing joint so as to be cantilevered relative to the energy absorbing joint and substantially entirely into the other of the closure or the body member when the energy absorbing joint is placed in the deformed state during the associated impact.

2. The stopper assembly of claim 1 wherein the energy absorbing joint includes at least one of a rivet, a shear pin, a bolt, a weld, and or an adhesive bond.

3. The stopper assembly of claim 1 wherein the closure includes at least one of a hood, a trunk, a door, or a glovebox.

4. The stopper assembly of claim 1 wherein the second end of the stopper is threadably engaged with the base for adjusting a vertical height of the closed position of the closure and to regulate a contact pressure between the closure and the stopper.

5. The stopper assembly of claim 4 wherein the second end of the stopper includes integrally formed external threads, the external threads engaging a threaded aperture in the base.

6. A hood stopper system for an associated vehicle for absorbing at least a portion of an impact energy during a pedestrian hood strike, the associated vehicle including a hood for covering an engine compartment of the associated vehicle, the hood including a hinged end and a free end and the hood having an open position and a closed position, the engine compartment including a horizontal support disposed adjacent the free end of the hood when the hood is in the closed position, the system comprising:

a hood stopper for supporting the free end of the hood when the hood is in the closed position, the hood stopper including a first end and a second end, the first end of the stopper being in contact with one of an underside of the hood or the horizontal support when the hood is in the closed position and being spaced apart therefrom when the hood is in the open position;

a base including a fixed end and a free end, the fixed end of the base being secured to the other of the horizontal support or the underside of the hood via a deformable joint, the second end of the hood stopper being secured to the base for supporting the hood stopper and the free end of the hood;

a break-away energy absorbing adhesive bond disposed adjacent the base and the deformable joint, the adhesive bond having a maximum stress value and being substantially resilient when subject to a hood load below the maximum stress value;

wherein the maximum stress value is exceeded and the adhesive bond ruptures to allow the base, the hood stopper, and the hood to deflect and absorb at least a portion of the impact energy during the pedestrian hood strike.

7. The hood stopper system of claim 6 wherein the break-away energy absorbing bond is disposed between a lower surface of the horizontal support and an upper surface of the base.

8. The hood stopper system of claim 6 wherein the adhesive bond is disposed at the free end of the base.

9. The hood stopper system of claim 6 wherein the adhesive bond is disposed substantially along a peripheral edge of the base.

10. The hood stopper system of claim 6 wherein the deformable joint includes at least one of a rivet, a shear pin, a bolt, and or a weld.

11. The hood stopper system of claim 10 wherein the deformable joint absorbs at least a portion of the impact energy during the pedestrian hood strike.

12. A hood stopper system for an associated vehicle for absorbing at least a portion of an impact energy during a pedestrian hood strike, the associated vehicle including a hood for covering an engine compartment of the associated vehicle, the hood including a hinged end and a free end and the hood having an open position and a closed position, the engine compartment including a support member disposed adjacent the free end of the hood when the hood is in the closed position, the system comprising:

a hood stopper for supporting the free end of the hood when the hood is in the closed position, the hood stopper including a first end and a second end, the first end of the stopper being, in contact with one of an underside of the hood of the associated vehicle or the support member when the hood is in the closed position and being spaced apart therefrom when the hood is in the open position;

a plate disposed adjacent the other of the underside of the hood or the support member, the second end of the hood stopper secured to the plate, the plate adapted to support the hood stopper and the free end of the hood;

an energy absorbing fracture region in the plate adjacent the hood stopper, the energy absorbing fracture region having a maximum stress value and being substantially resilient when subject to a hood load below the maximum stress value;

wherein the maximum stress value is exceeded and the energy absorbing fracture region fractures to allow the hood and the hood stopper to deflect and absorb at least an initial portion of the impact energy during the pedestrian hood strike.

13. The hood stopper system of claim 12 wherein the second end of the hood stopper includes a reduced diameter portion and the plate includes an aperture for receiving the reduced diameter portion.

14. The hood stopper system of claim 12 wherein the energy absorbing fracture region includes a circular stress concentrating groove.

15. The hood stopper system of claim 12 wherein the energy absorbing fracture region includes a plurality of stress concentrating apertures or perforations extending through the plate.

16. The hood stopper system of claim 12 wherein the support member includes an aperture disposed below the hood stopper for allowing the hood stopper to translate downward into the support member during the pedestrian hood strike.

17. A hood stopper system for an associated vehicle for absorbing at least a portion of an impact energy during a pedestrian hood strike, the associated vehicle including a hood for covering an engine compartment of the associated vehicle, the hood including a hinged end and a free end and the hood having an open position and a closed position, the engine compartment including a support member disposed adjacent the free end of the hood when the hood is in the closed position, the system comprising:

a hood stopper for supporting the free end of the hood when the hood is in the closed position, the hood stopper including a first end and a second end, the first end of the stopper being in contact with one of an underside of the hood of the associated vehicle or the support member when the hood is in the closed position and being spaced apart therefrom when the hood is in the open position;

a plate disposed adjacent the other of the underside of the hood or the support member, the second end of the hood stopper secured to the plate, the plate adapted to support the hood stopper and the free end of the hood;

an energy absorbing region in the plate adjacent the hood stopper, the energy absorbing region having a maximum stress value and being substantially resilient when subject to a hood load below the maximum stress value;

wherein the maximum stress value is exceeded and the energy absorbing region ruptures to allow the hood and the hood stopper to deflect and absorb at least an initial portion of the impact energy during the pedestrian hood strike, and wherein an adhesive bond is disposed between the energy absorbing region of the plate and an adjacent wall of the other of the underside of the hood or the support member.

18. A method for absorbing at least a portion of an impact energy between a pedestrian and a hood of an associated vehicle, the method comprising the steps of:

providing an energy absorbing hood stopper assembly, the assembly disposed beneath the hood of the associated vehicle and secured to one of a cross support member or an underside portion of the hood, the hood stopper assembly including a hood stopper and a base plate, the base plate being secured to the other of the support member or the underside portion of the hood;

providing an energy absorbing joint adjacent the base plate, the energy absorbing joint having a maximum stress value below which the joint remains resilient;

exceeding the maximum stress value of the joint during a pedestrian hood impact;

deforming or fracturing the energy absorbing joint, the hood, and the base plate and rupturing an adhesive bond between the base plate and the support member; and absorbing at least a portion of the impact energy during the pedestrian hood impact.

19. An energy absorbing stopper assembly for an associated vehicle for absorbing at least a portion of the energy during an associated impact, the associated vehicle including a pivotally disposed closure and a body member toward which the closure is closable, the closure having an open position and a closed position, the stopper assembly comprising:

a stopper for supporting a non-hinged end of the closure when the closure is in the closed position, the stopper includes a first end and a second end, the first end of the stopper being in contact with one of the closure or the body member when the closure is in the closed position and being spaced apart therefrom when the closure is in the open position;

an energy absorbing bracket disposed substantially within an internal cavity of the other of the closure or the body member for supporting the second end of the stopper, the bracket including a horizontal base member, a first support leg and a second support leg, a first end of the first and second support legs being attached to opposite ends of the horizontal base member and a second end of the first and second support legs being attached to the other of the closure or the body member, the bracket being substantially resilient below a maximum load value in an undeformed state and being configured to deform while absorbing at least a portion of the energy during an associated impact of the closure; and wherein the energy absorbing bracket and the stopper deflect into the internal cavity of the other of the closure or the body member when the energy absorbing bracket is deformed during the associated impact.

20. The stopper assembly of claim 19, wherein the energy absorbing bracket and the stopper are configured to be received entirely within the internal cavity of the other of the body member or the closure during the associated impact.

21. The stopper assembly of claim 19, wherein the energy absorbing bracket is disposed entirely within the body member and the first end of the stopper protrudes through an aperture in a top wall of the body member.

* * * * *